(12) United States Patent
Yamamoto

(10) Patent No.: US 9,398,624 B2
(45) Date of Patent: Jul. 19, 2016

(54) WIRELESS COMMUNICATION

(71) Applicant: NEC ACCESS TECHNICA, LTD., Shizuoka (JP)

(72) Inventor: Takuya Yamamoto, Shizuoka (JP)

(73) Assignee: NEC Platforms, Ltd., Kanagawa (JP)

( * ) Notice: Subject to any disclaimer, the term of this patent is extended or adjusted under 35 U.S.C. 154(b) by 152 days.

(21) Appl. No.: 13/689,234

(22) Filed: Nov. 29, 2012

(65) Prior Publication Data

US 2013/0176956 A1 Jul. 11, 2013

(30) Foreign Application Priority Data

Jan. 10, 2012 (JP) .................................. 2012-001927

(51) Int. Cl.
```
G06K 7/10      (2006.01)
H04J 3/08      (2006.01)
H04W 24/00     (2009.01)
H04W 76/02     (2009.01)
H04B 1/00      (2006.01)
H04W 48/16     (2009.01)
```
(52) U.S. Cl.
CPC ............ *H04W 76/021* (2013.01); *H04W 76/02* (2013.01); *H04W 48/16* (2013.01)

(58) Field of Classification Search
CPC ..... H04W 84/12; H04W 76/02; H04W 28/18; H04W 88/08; H04W 48/16; H04W 76/021; H04W 48/20; H04W 88/12
USPC .................. 370/338, 328, 310, 254, 404, 444
See application file for complete search history.

(56) References Cited

U.S. PATENT DOCUMENTS

| | | | | |
|---|---|---|---|---|
| 8,098,709 | B2 * | 1/2012 | Wakizaka | H04B 1/7143 370/474 |
| 2006/0208088 | A1 * | 9/2006 | Sekiguchi | G06K 7/1095 235/472.02 |
| 2011/0205953 | A1 * | 8/2011 | Kuwahara | H04W 48/18 370/315 |
| 2011/0255398 | A1 * | 10/2011 | Sakai | H04W 48/20 370/216 |
| 2012/0211559 | A1 * | 8/2012 | Okuyama et al. | 235/375 |
| 2013/0028246 | A1 * | 1/2013 | Gonikberg | 370/338 |
| 2013/0196672 | A1 * | 8/2013 | Alexis | 455/445 |
| 2014/0171121 | A1 * | 6/2014 | Jan | H04W 64/006 455/456.3 |

FOREIGN PATENT DOCUMENTS

| | | | |
|---|---|---|---|
| JP | 2001-502494 A | 2/2001 | |
| JP | 2001-142825 A | 5/2001 | |
| JP | 2001-154965 A | 6/2001 | |

(Continued)

OTHER PUBLICATIONS

Communication dated Oct. 22, 2013, issued by the Japanese Patent Office in corresponding Application No. 2012-001927.

*Primary Examiner* — Charles C Jiang
*Assistant Examiner* — Will Lin
(74) *Attorney, Agent, or Firm* — Sughrue Mion, PLLC

(57) ABSTRACT

Wireless communication terminal 100 reads connection setting information for making a connection to access point 200, the connection setting information including a plurality of identifiers of access point 200. Wireless communication terminal 100 stores the read connection setting information. Wireless communication terminal 100 reads the stored connection setting information and uses an identifier informed by access point 200 and the read connection setting information to set wireless communication connection with access point 200.

13 Claims, 14 Drawing Sheets

(56) References Cited

FOREIGN PATENT DOCUMENTS

| | | |
|---|---|---|
| JP | 2002-063652 A | 2/2002 |
| JP | 2002-281040 A | 9/2002 |
| JP | 2003-143457 A | 5/2003 |
| JP | 2003-333666 A | 11/2003 |
| JP | 2004-007351 A | 1/2004 |
| JP | 2004-193753 A | 7/2004 |
| JP | 2004-228800 A | 8/2004 |
| JP | 2005-065018 A | 3/2005 |
| JP | 2005-176021 A | 6/2005 |
| JP | 2005-242732 A | 9/2005 |
| JP | 2005-286439 A | 10/2005 |
| JP | 2005-286941 A | 10/2005 |
| JP | 2005-347981 A | 12/2005 |
| JP | 2006-005397 A | 1/2006 |
| JP | 2006-108939 A | 4/2006 |
| JP | 2006-121185 A | 5/2006 |
| JP | 2006-157814 A | 6/2006 |
| JP | 2006-157815 A | 6/2006 |
| JP | 2006-261938 A | 9/2006 |
| JP | 2006-285826 A | 10/2006 |
| JP | 2007-081987 A | 3/2007 |
| JP | 2007-102562 A | 4/2007 |
| JP | 2007-104443 A | 4/2007 |
| JP | 2007-215120 A | 8/2007 |
| JP | 2011-139199 A | 7/2011 |
| WO | 03/034660 A1 | 4/2003 |

* cited by examiner

Fig.7

```
URL=http://www.XXXXX&
Product=XXXXX&
MAC=000102030405&
SSID=ssid1&
Network1=WPA1&
Pass1=1134567890&
SSID2=ssid2&
Network2=WPA2&
Pass2=2234567890&
 •
 •
 •
Version=1
```

WIRELESS COMMUNICATION

This application is based upon and claims the benefit of priority from Japanese Patent Application No. 2012-1927 filed on Jan. 10, 2012, the content of which is incorporated by reference.

BACKGROUND OF THE INVENTION

1. Field of the Invention

The present invention relates to a wireless communication terminal, an information providing medium, an access point, a wireless communication method, and a program for wireless communication.

2. Description of the Related Art

In recent years, portable terminals and smartphones are widely used, and high-capacity data transfer using a portable communication network is increasing. Therefore, it is urgent to take measures against congestion of the portable communication network in each carrier that provides mobile phone services.

Many of the smartphones have a wireless LAN (Local Area Network) function. It is considered that congestion of the portable communication network can be alleviated if the traffic of the high-capacity data transfer in the portable communication network can be moved to a wired network using the wireless LAN function.

A wireless LAN connection is set by recording a profile in a slave device, such as a portable terminal, the profile comprising connection setting information including an SSID (Service Set Identifier) as an identifier included in beacon information or in Probe Response information transmitted (informed) from a master device, such as an access point, as well as an encryption mode and a password defined in the master device. Currently, the user of the slave device, such as a portable terminal, manually sets the profile.

A technique is also disclosed, in which a destination address is bar-coded, and a bar code scanner reads the bar code to access the destination (for example, see JP2001-154965A).

SUMMARY OF THE INVENTION

However, in the manual setting and connection, all channels need to be scanned to search all surrounding access points to display a list of the search results to find out a result corresponding to the access point name from the list. An encryption mode for connecting and communicating with the access point needs to be selected from the list, and an encrypted key for connecting and communicating with the access point needs to be input. Therefore, there is a problem in which efforts are required for the operations. Furthermore, if the master device includes a plurality of wireless circuits or a plurality of SSIDs and passwords, there is a problem in which the user needs to manually create profiles equivalent to the number of SSIDs for connecting the portable terminal.

The technique disclosed in JP2001-154965A just automates the input of the destination address and does not facilitate the input of connection setting information for wireless LAN connection.

An object of the present invention is to provide a wireless communication terminal, an information providing medium, an access point, a wireless communication method, and a program for solving the problems.

The present invention provides a wireless communication terminal used in a wireless communication system including an access point, the wireless communication terminal comprising:

an information reader that reads connection setting information for connection with the access point, the connection setting information including a plurality of identifiers of the access point;

a storage that stores the connection setting information read by the information reader; and a controller that uses an identifier of the access point informed by the access point and the connection setting information read from the storage to set wireless communication connection with the access point.

The present invention provides an information providing medium used in a wireless communication system including an access point, the information providing medium providing connection setting information read by a wireless communication terminal comprising:

an information reader that reads connection setting information for connection with the access point, the connection setting information including a plurality of identifiers of the access point;

a storage that stores the connection setting information read by the information reader; and a controller that uses an identifier of the access point informed by the access point and the connection setting information read from the storage to set wireless communication connection with the access point.

The present invention provides an access point used in a wireless communication system including an access point, the access point providing connection setting information read by a wireless communication terminal comprising:

an information reader that reads connection setting information for connection with the access point, the connection setting information including a plurality of identifiers of the access point;

a storage that stores the connection setting information read by the information reader; and a controller that uses an identifier of the access point informed by the access point and the connection setting information read from the storage to set wireless communication connection with the access point.

The present invention provides a wireless communication method between an access point and a wireless communication terminal, the wireless communication method comprising:

reading connection setting information for connection with the access point, the connection setting information including a plurality of identifiers of the access point;

storing the read connection setting information;

reading the stored connection setting information; and using an identifier of the access point informed by the access point and the read connection setting information to set the wireless communication connection with the access point.

The present invention provides a program executed by a wireless communication terminal used in a wireless communication system including an access point, the program comprising:

reading connection setting information for connection with the access point, the connection setting information including a plurality of identifiers of the access point;

storing the read connection setting information;

reading the stored connection setting information; and using an identifier of the access point informed by the access point and the read connection setting information to set the wireless communication connection with the access point.

As described, wireless LAN connection can be easily performed in the present invention.

The above and other objects, features, and advantages of the present invention will become apparent from the following description with reference to the accompanying drawings which illustrate an example of the present invention.

BRIEF DESCRIPTION OF THE DRAWINGS

FIG. 7 is a diagram showing an example of connection setting information written in a label;

EXEMPLARY EMBODIMENTS

Exemplary embodiments will now be described with reference to the drawings.

Figure 1:
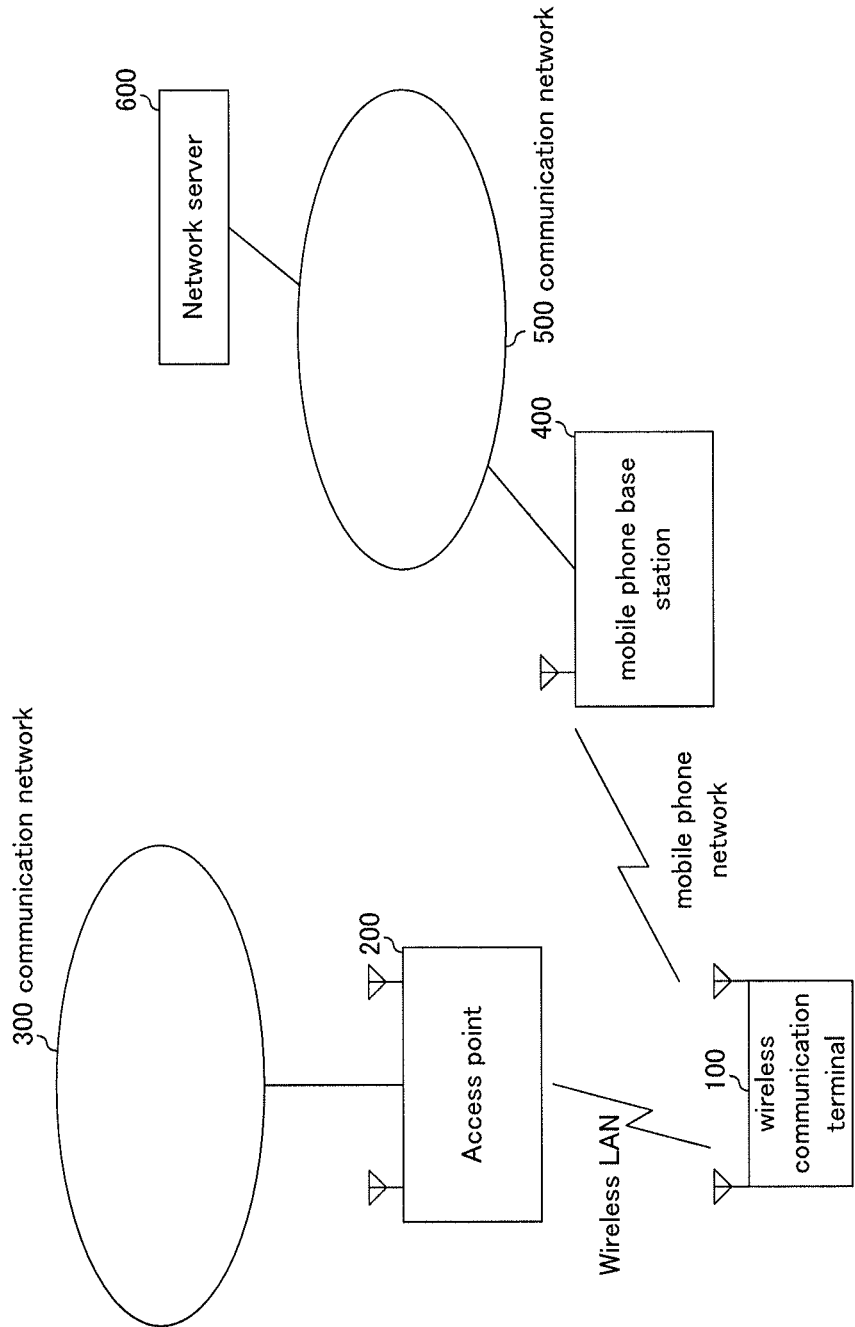
FIG. 1 is a diagram showing an exemplary embodiment of a wireless communication system including a wireless communication terminal and an access point of the present invention.

FIG. 1 discloses an exemplary embodiment of a wireless communication system including wireless communication terminal 100 and access point 200 of the present invention.

Wireless communication terminal 100 is a wireless communication apparatus with a wireless LAN function and uses the wireless LAN function to connect to access point 200.

Access point 200 uses a wireless LAN function to connect to wireless communication terminal 100. Access point 200 is connected to communication network 300 using wiring.

Wireless communication terminal 100 can be connected to mobile phone base station 400 as a wireless base station of a general mobile phone network through a mobile phone line and is connected to communication network 500 through mobile phone base station 400. Network server 600 is connected to communication network 500. Network server 600 can comprehensively manage profiles for wireless LAN connection.

Figure 2:
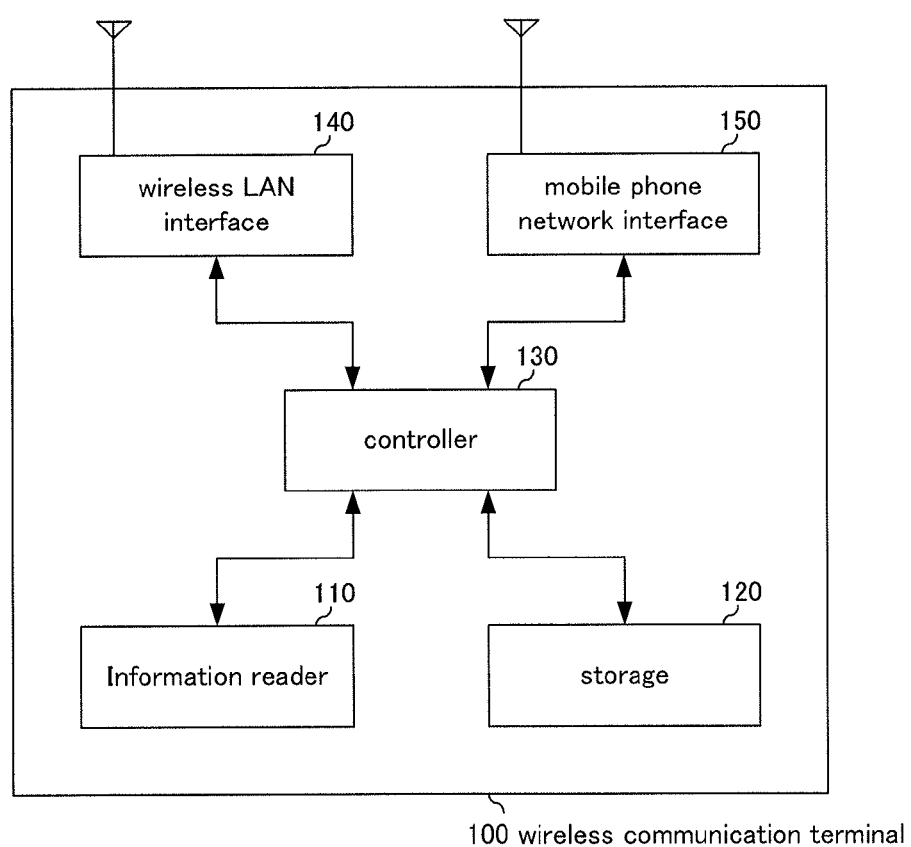
FIG. 2 is a diagram showing an example of an internal configuration of the wireless communication terminal shown in FIG. 1.

As shown in FIG. 2, wireless communication terminal 100 shown in FIG. 1 includes information reader 110, storage 120, controller 130, wireless LAN interface 140, and mobile phone network interface 150. FIG. 2 illustrates only constituent elements related to the present invention among the constituent elements of wireless communication terminal 100 shown in FIG. 1.

Information reader 110 reads connection setting information for connection to access point 200. The method of reading depends on how the connection setting information is provided, and examples of the method include a method of reading a figure or a code, such as a bar code and a two-dimensional code, describing the connection setting information (camera or code reader) and a method of reading information written in an RF (Radio Frequency) tag. The connection setting information includes, as identifiers, a plurality of SSIDs set to access point 200. From where information reader 110 reads the connection setting information will be described later. The connection setting information read by information reader 110 may be displayed on a display unit (not shown) included in wireless communication terminal 100.

The connection setting information also includes encrypted information for setting wireless communication connection with access point 200 and a control command for access point 200.

Storage 120 stores, as a profile, the connection setting information read by information reader 110. In this case, it is preferable that storage 120 stores the connection setting information so that the connection setting information can be searched using the identifier (SSID) included in the connection setting information as a search key. More specifically, it is preferable to store the SSID in an area designated as a search target in storage 120 and to store other elements included in the connection setting information in association with the SSID.

The profiles stored in storage 120 can be transferred (copied) to another apparatus through infrared data communication or through a transferable storage medium. The profiles stored in storage 120 can be comprehensively managed on network server 600 through mobile phone network interface 150. When the profile information of the access point is changed, the access point informs network server 600 of the details of the change, and network server 600 uses the mobile phone network to notify wireless communication terminal 100 of the change.

Controller 130 writes, in storage 120, the connection setting information read by information reader 110 as a profile. Controller 130 reads the connection setting information from storage 120. Controller 130 uses the SSID of access point 200 informed (broadcasted) by access point 200 and the connection setting information read from storage 120 to set the wireless communication connection with access point 200 through wireless LAN interface 140. If access point 200 enables a function to conceal the SSID (SSID stealth function), controller 130 loads the SSID written in the profile on a scan packet to transmit the scan packet when wireless communication terminal 100 scans access point 200, and access point 200 responds to the scan packet by disclosing the SSID only to the scan packet with the SSID of access point 200. In this way, the wireless communication connection between access point 200 and wireless communication terminal 100 is carried out. As described, a plurality of SSIDs are stored in storage 120, and controller 130 searches a predetermined SSID (hereinafter, called "priority SSID") from the SSIDs. More specifically, controller 130 searches, from storage 120, the same priority SSID as the SSID of access point 200 informed by access point 200. In storage 120, a certain mark may be provided to the priority SSID, such as by setting a flag of one bit.

Controller 130 selects the priority SSID. The selection method will be described later. Controller 130 determines the priority SSID after wireless LAN interface 140 carries out a wireless scan to determine the priority SSID.

The number of priority SSIDs may be one or more than one. If the number of priority SSIDs is one, the priority SSID may be able to be set by operation from outside of wireless communication terminal 100. An SSID using a frequency band in the optimum wireless communication state may be set as the priority SSID. An SSID that has the encrypted mode, which is indicated in the connection setting information, indicating the highest strength of encryption may be set as the priority SSID. A plurality of SSIDs, such as a primary SSID and a secondary SSID, may be set, and the primary SSID or another SSID may be set as the priority SSID depending on the level of access to access point 200. Examples of a method of determining whether the wireless communication state is optimum include the following methods.

(1) Fixed determination method (if there is an SSID using a wireless frequency of a 2.4 GHz band and an SSID using a 5 GHz band, one of the SSIDs determined in advance in the application is selected).

(2) Method of applying wireless scan to all channels to determine the SSID according to the reception strength of the wireless signal of another access point in the same channel as the access point to be connected (ratio of the reception strength of the access point relative to the reception strength of another access point, or the difference in the reception strength, is calculated to select an SSID having a greater ratio or a greater difference).

(3) Method of applying wireless scan to all channels to determine, according to the number of other access points in the same channel, the access point to be connected.

The policies (1), (2), and (3) for determining the priority SSID are expanded to storage 120, and controller 130 determines the SSID with reference to the policies (1), (2), and (3) based on the SSID received by wireless LAN interface 140 and the SSID read by reader 110 from the connection setting information.

When the wireless scan is performed to determine the SSID, a frequency band without the access point information written in the generated profile (connection setting information) in the response from the access point is removed from the determination of the priority SSID.

After writing the profile in storage 120, controller 130 also carries out, once the wireless scan has been performed, active scan for providing the SSID of the access point to the packet information to transmit the SSID to allow handling the concealment of the SSID by the access point (access point with the SSID stealth function) in determining the priority SSID or in wireless scan and connection request for connection after the priority connection.

Wireless LAN interface 140 has an interface function for wireless LAN communication with access point 200. Wireless LAN interface 140 carries out a wireless scan to determine the priority SSID.

Mobile phone network interface 150 has an interface function for accessing the mobile phone network.

The wireless communication system shown in FIG. 1 includes a plurality of wireless communication means using a plurality of same or different wireless systems. For example, examples of the wireless communication means include a wireless system for connection with a mobile phone line, a wireless system of a wireless LAN, infrared data communication, other wireless systems, and wireless systems with different wireless frequencies among these wireless systems.

Figure 3:
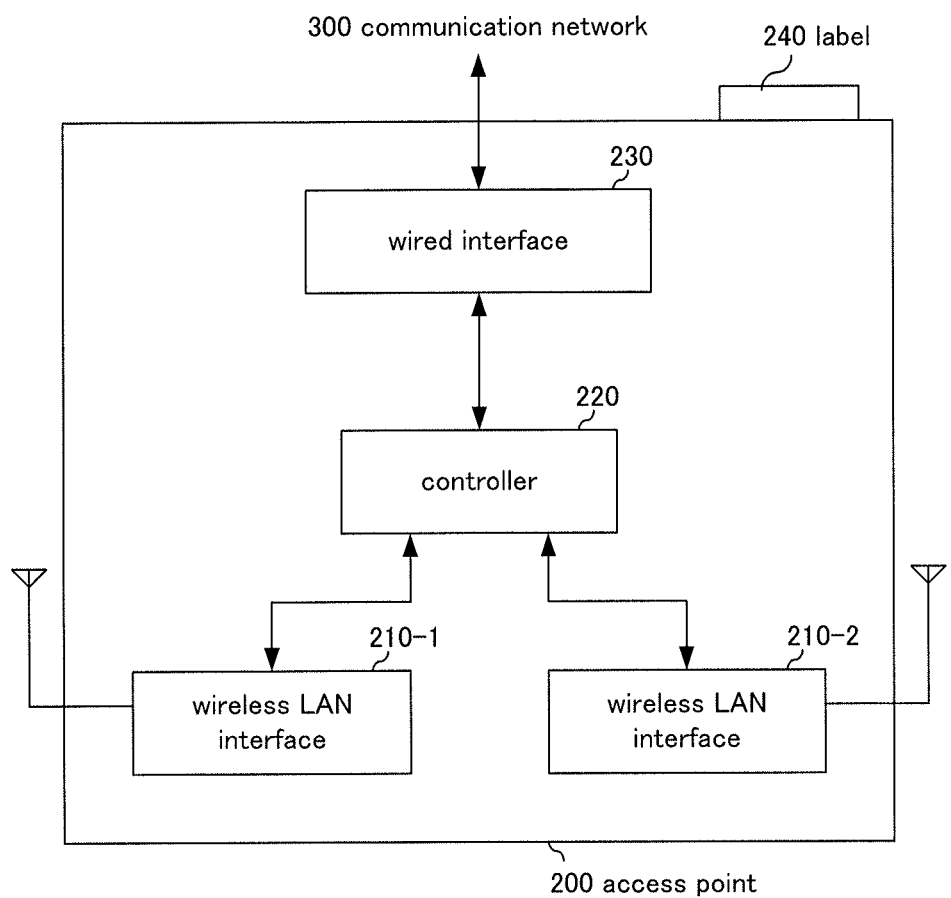
FIG. 3 is a diagram showing an example of an internal configuration of the access point shown in FIG. 1.

As shown in FIG. 3, access point 200 shown in FIG. 1 includes wireless LAN interfaces 210-1, 210-2, controller 220, wired interface 230, and label 240. FIG. 3 shows only constituent elements related to the present invention among the constituent elements included in access point 200 shown in FIG. 1.

Wireless LAN interfaces 210-1 and 210-2 have an interface function for wireless LAN communication with wireless communication terminal 100 including a wireless LAN function. Wireless LAN interface 210-1 and wireless LAN interface 210-2 include difference connection setting information. A method of providing the connection setting information will be described later.

Controller 220 controls entire access point 200. Controller 220 also mediates a signal transferred between wireless LAN interfaces 210-1, 210-2 and wireless communication terminal 100 as well as a signal transferred between wired interface 230 and communication network 300.

Wired interface 230 has an interface function for wired communication with communication network 300.

Label 240 is an information providing medium for providing the connection setting information. The connection setting information is written in label 240. A figure, a bar code, or a two-dimensional code may be used to convert the connection setting information written in label 240 to display (print) the information. Label 240 may be an RF tag, and the connection setting information may be electronically written in a memory inside of label 240. Character strings of the connection setting information may be encrypted by an arbitrary encryption system.

Figure 4:
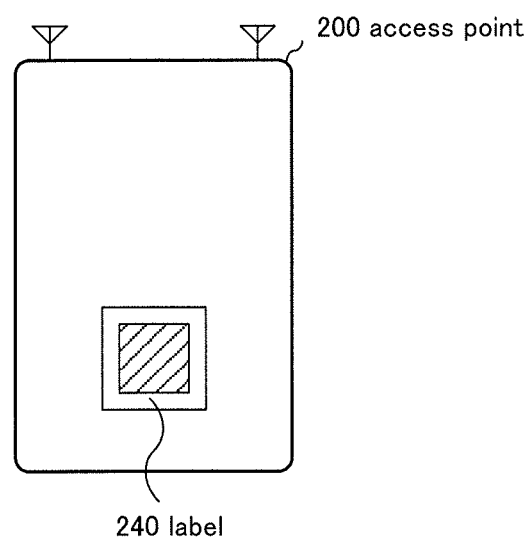
FIG. 4 is a diagram showing an example of an appearance of the access point shown in FIG. 3.

As shown in FIG. 4, label 240 is attached to access point 200 shown in FIG. 3. Information reader 110 of wireless communication terminal 100 reads the connection setting information written in attached label 240, and wireless communication terminal 100 acquires the connection setting information for access point 200.

Figure 5:
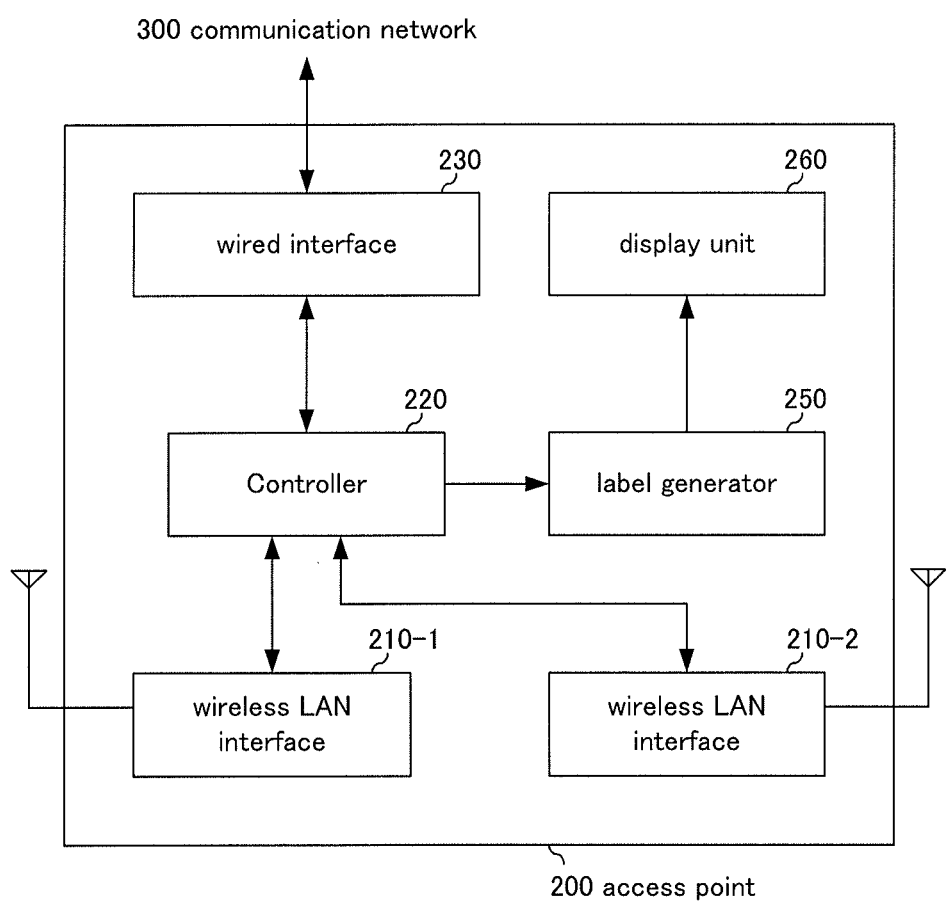
FIG. 5 is a diagram showing another example of the internal configuration of the access point shown in FIG. 1.

As shown in FIG. 5, access point 200 shown in FIG. 1 includes wireless LAN interfaces 210-1, 210-2, controller 220, wired interface 230, label generator 250, and display unit 260. FIG. 5 illustrates only constituent elements related to the present invention among the constituent elements included in access point 200 shown in FIG. 1.

Wireless LAN interfaces 210-1, 210-2, controller 220, and wired interface 230 are the same as the ones shown in FIG. 3.

Label generator 250 generates a label displaying the connection setting information for wireless LAN interfaces 210-1 and 210-2. When the label is displayed on display unit 260, information reader 110 of wireless communication terminal 100 can identify the label. The label is formed by converting the character strings of the connection setting information to a figure, a bar code, or a two-dimensional code. The character strings of the connection setting information may be encrypted.

Display unit 260 is a display that electronically displays the label generated by label generator 250.

Figure 6:
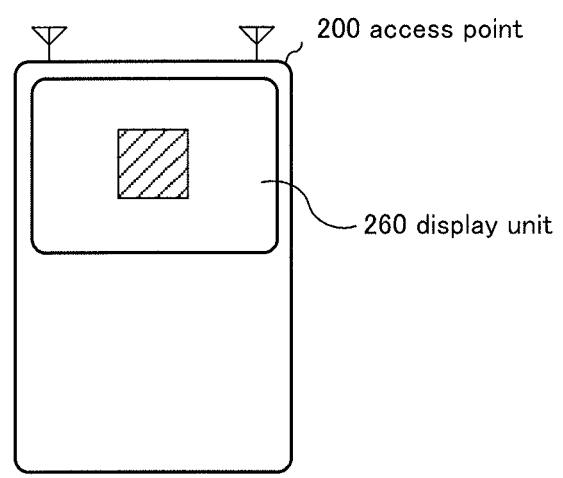
FIG. 6 is a diagram showing an example of an appearance of the access point shown in FIG. 5.

As shown in FIG. 6, display unit 260 that displays information is mounted on access point 200 shown in FIG. 5, and a label (shaded section in FIG. 6) is displayed on display unit 260. Information reader 110 of wireless communication terminal 100 reads the connection setting information written in the displayed label, and wireless communication terminal 100 acquires the connection setting information for access point 200.

The label describing the connection setting information may be included in the package of access point 200 as an information providing medium, instead of being attached to or displayed on access point 200. The label may be posted on an advertisement of access point 200. Web may be accessed from a communication terminal, such as a PC (Personal Computer), through access point 200, and an IP (Internet Protocol) address of access point 200 may be input to the PC to access access point 200 to display the label on the Web page.

The connection setting information described above includes the following information.

All SSIDs for wireless LAN communication by access point 200

Encrypted mode information for wireless connection necessary for all SSIDs

Encrypted key information of wireless data used in each encrypted mode

Product information (product name) of access point 200

MAC (Media Access Control) address of access point 200

URL (Uniform Resource Locator) of the Web site

Version information of the code

Control commands for controlling the wireless communication terminal and the access point Part or all of the information may be encrypted in a specific encryption mode to prevent correctly reading the information even if an attempt is made to read the information using a general-purpose code reader.

As shown in FIG. 7, the connection setting information includes a URL, a serial number, a MAC address, and a version number of the label. For each SSID, the SSID, a password, and a network number are written.

Figure 8:
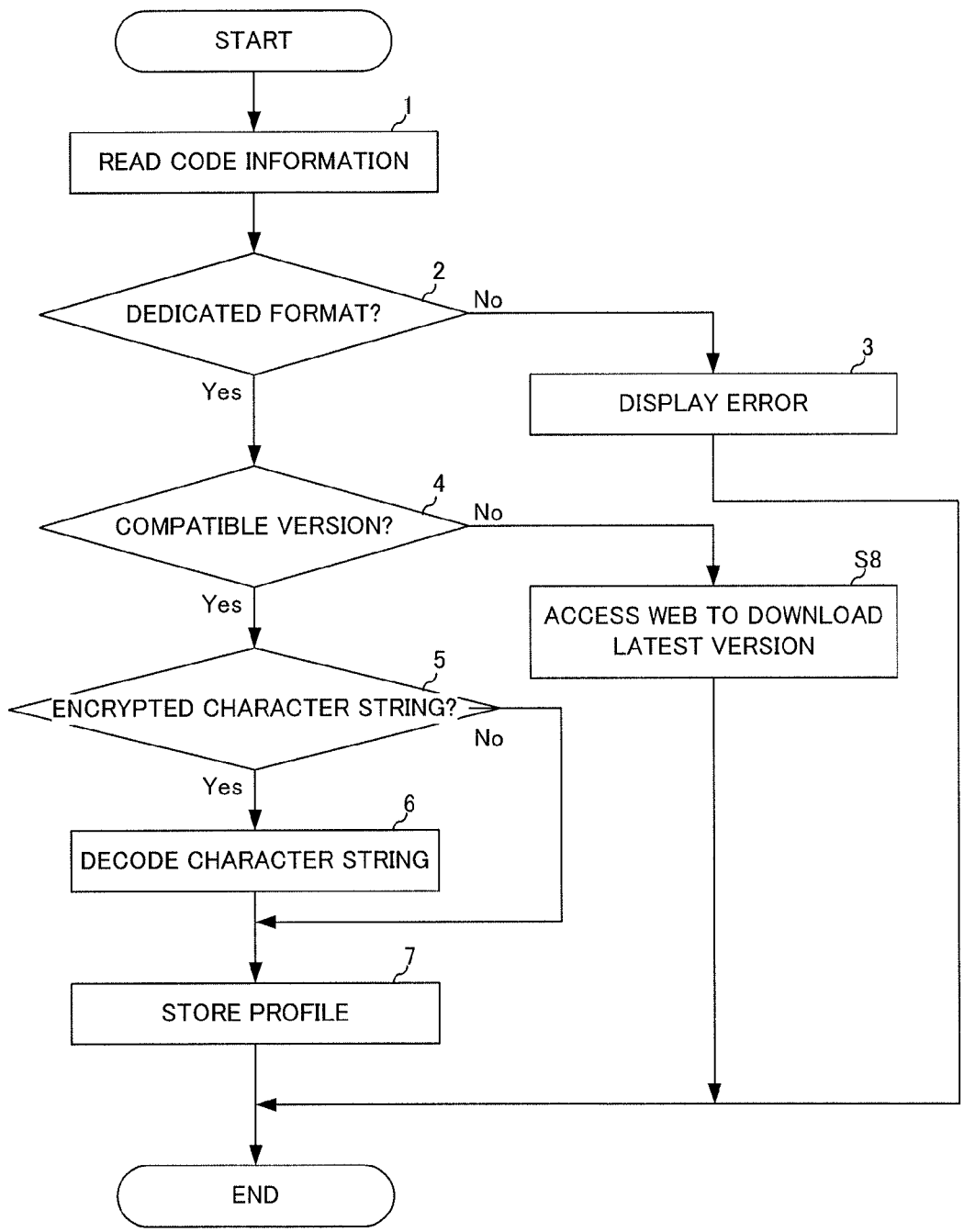
FIG. 8 is a flow chart for describing a process of reading connection setting information by the wireless communication terminal in a wireless communication method of the wireless communication system shown in FIG. 1.

A process of reading the connection setting information by wireless communication terminal 100 in the wireless communication method of the wireless communication system shown in FIG. 1 will be described with reference to FIG. 8. In the example described here, the connection setting information is displayed by a two-dimensional code, and the displayed label is attached to access point 200. In the described example, processes by the elements of wireless communication terminal 100 are realized by executing of an application (executed by controller 130).

In step 1, information reader 110 reads the two-dimensional code displayed on the label attached to access point 200 based on an operation performed by the user of wireless communication terminal 100.

In step 2, information reader 110 determines whether the format of the read two-dimensional code is a dedicated format. Confirmation of the format is realized by determining whether information reader 110 recognizes a preset format and determining whether the recognized format and the format of the read two-dimensional code are the same or compatible.

If the format of the two-dimensional code read by information reader 110 is not the dedicated format, an error indicating that the format is not the dedicated format is displayed in step 3. The display is performed by a display unit included in wireless communication terminal 100.

On the other hand, if the format of the two-dimensional code read by information reader 110 is the dedicated format, controller 130 determines whether the version information included in the connection setting information indicated by the two-dimensional code indicates a version compatible with the application executed by controller 130 in step 4. The method of determining whether the version is compatible may be a general method. For example, a method similar to the method of determining whether a pair of applications is compatible may be used.

If the version is compatible, controller 130 determines whether the read two-dimensional code is an encrypted character string in step 5. If the read two-dimensional code is an encrypted character string, controller 130 decodes the connection setting information from the read two-dimensional code in step 6. In step 7, controller 130 writes the decoded connection setting information as a profile in storage 120 and stores a plurality of SSIDs in each set. A predetermined encryption system (encrypted information) is used for the decoding. For example, the character string used for the encryption and decoding may be a specific character string. If the connection setting information is provided in plain text, the decoding process of the connection setting information of step 6 is skipped. A specific bit can be set in the connection setting information to determine whether the connection setting information received by the terminal is in plain text or encrypted.

On the other hand, if the version is not compatible, wireless communication terminal 100 accesses the Web of the mobile phone network through mobile phone network interface 150 to download an application of the latest version in step 8.

Figure 9:
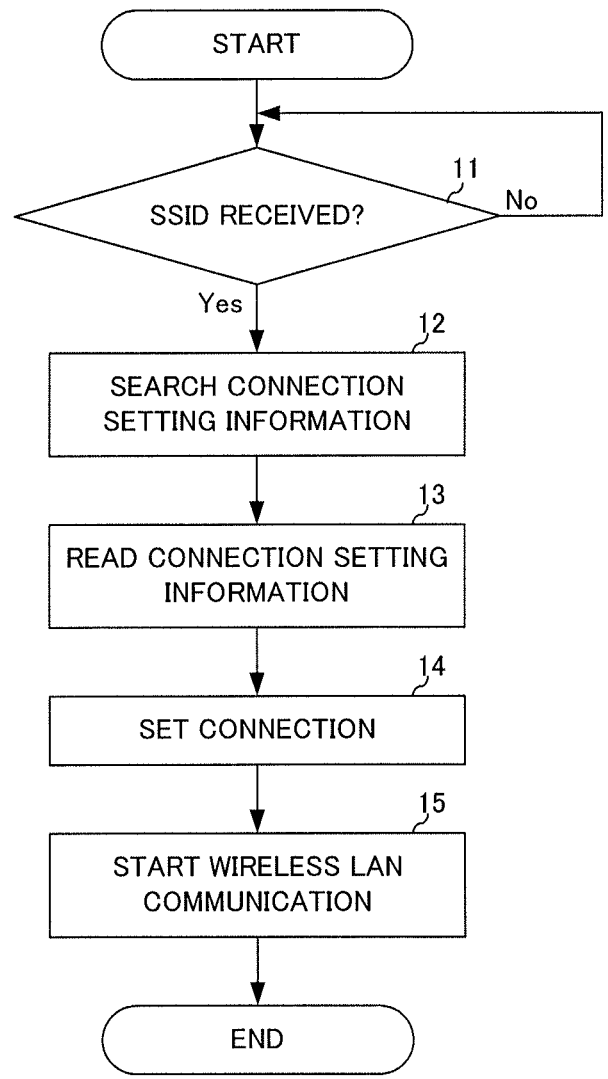
FIG. 9 is a flow chart for describing a process of connecting the wireless communication terminal and the access point in the wireless communication method of the wireless communication system shown in FIG. 1.

A process of connecting wireless communication terminal 100 and access point 200 in the wireless communication method of the wireless communication system shown in FIG. 1 will be described with reference to FIG. 9.

When wireless LAN interface 140 of wireless communication terminal 100 receives the SSID informed by access point 200 in step 11, controller 130 uses the received SSID as a search key to search the connection setting information (SSID) stored in storage 120 in step 12.

When the SSID can be searched, controller 130 reads the connection setting information associated with the searched SSID from storage 120 in step 13. In step 14, controller 130 uses the read connection setting information to perform connection setting of wireless LAN interface 140 and access point 200.

When the connection setting is completed, wireless LAN communication is started between wireless LAN interface 140 and access point 200 in step 15. If the function for denying wireless connection from a wireless communication terminal that does not coincide with the MAC address of the wireless communication terminal registered in advance in the access point (MAC address filtering function) is enabled, controller 220 adds the MAC address of the wireless communication terminal to the list of MAC addresses of wireless communication terminals for which connection is permitted.

Access to the Web may be permitted when, for example, a general-purpose code reader is used to read a two-dimensional code indicating the connection setting information, in which the URL information of the Web site is written in plain text that is not encrypted. If wireless communication terminal 100 can access the Web site, a dedicated application can be downloaded from the Web site. In this case, users may be ranked using plain text for free users and encrypted text for paid users. In this way, weights may be applied to the users in the provided service.

Hereinafter, a reception process of the SSID will be described in detail by comparing a general process and a process in the present invention.

Figure 10:
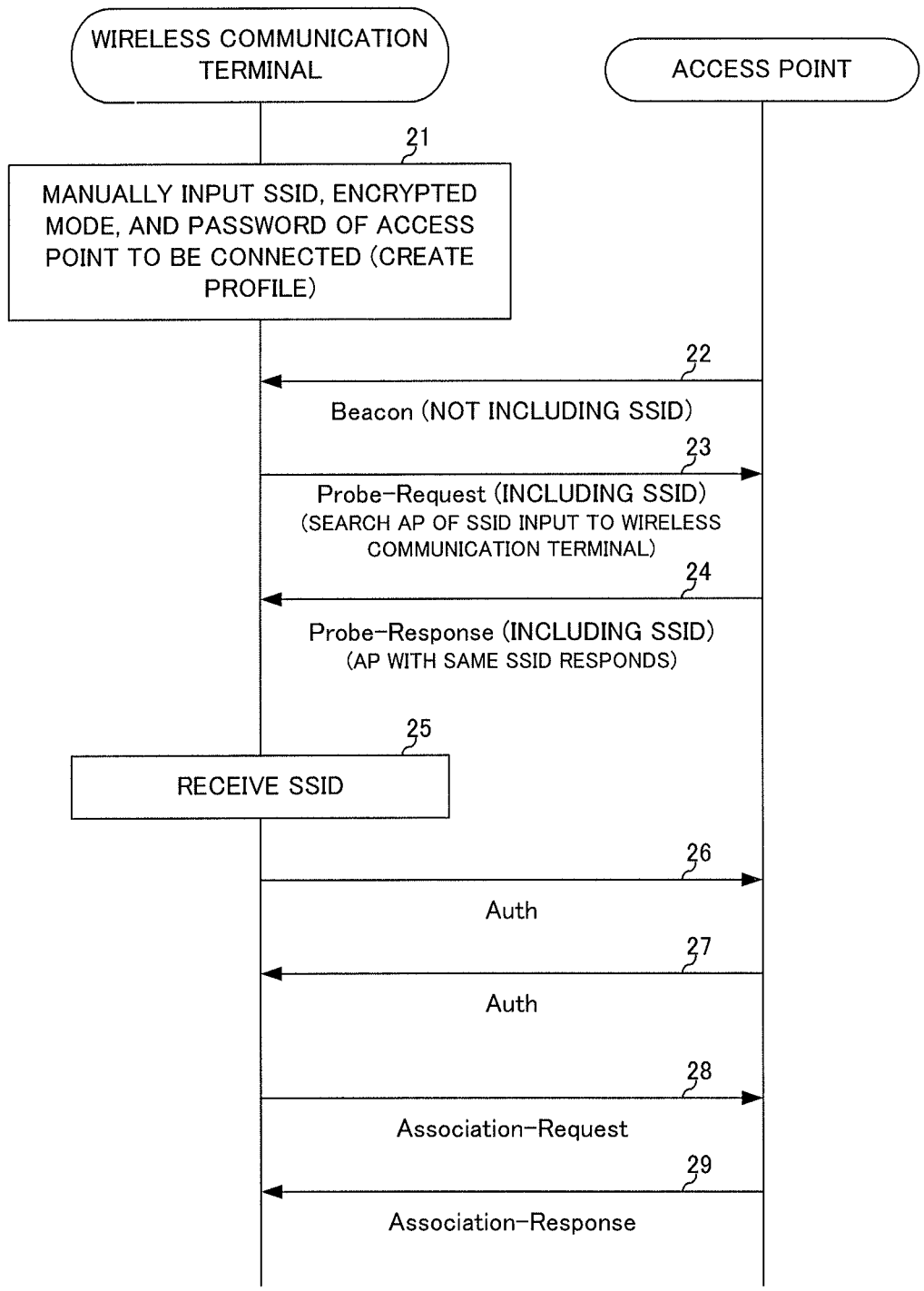
FIG. 10 is a sequence diagram for describing a general reception process of an SSID when the access point does not broadcast the SSID.

First, the general reception process of the SSID when the access point does not broadcast the SSID will be described with reference to FIG. 10.

In step 21, the user manually inputs the SSID, the encrypted mode, and the password of the access point to be connected to the wireless communication terminal to create a profile.

When the access point transmits a Beacon signal not including the SSID in step 22, the wireless communication terminal transmits a Probe-Request signal (including the SSID) to search the access point with the SSID input to the wireless communication terminal in step 23.

In step 24, the access point with the SSID included in the Probe-Request signal transmits a Probe-Response signal (including the SSID) as a response signal to the wireless communication terminal.

When the wireless communication terminal receives the SSID included in the Probe-Response signal in step 25, the wireless communication terminal transmits an Auth signal to the access point in step 26. In step 27, the access point transmits an Auth signal as a response signal to the wireless communication terminal.

In step 28, the wireless communication terminal transmits an Association-Request signal to the access point. In step 29, the access point transmits an Association-Response signal as a response signal to the wireless communication terminal.

Details of the signals are generally known and will not be particularly described here. The same applies to the following.

Figure 11:
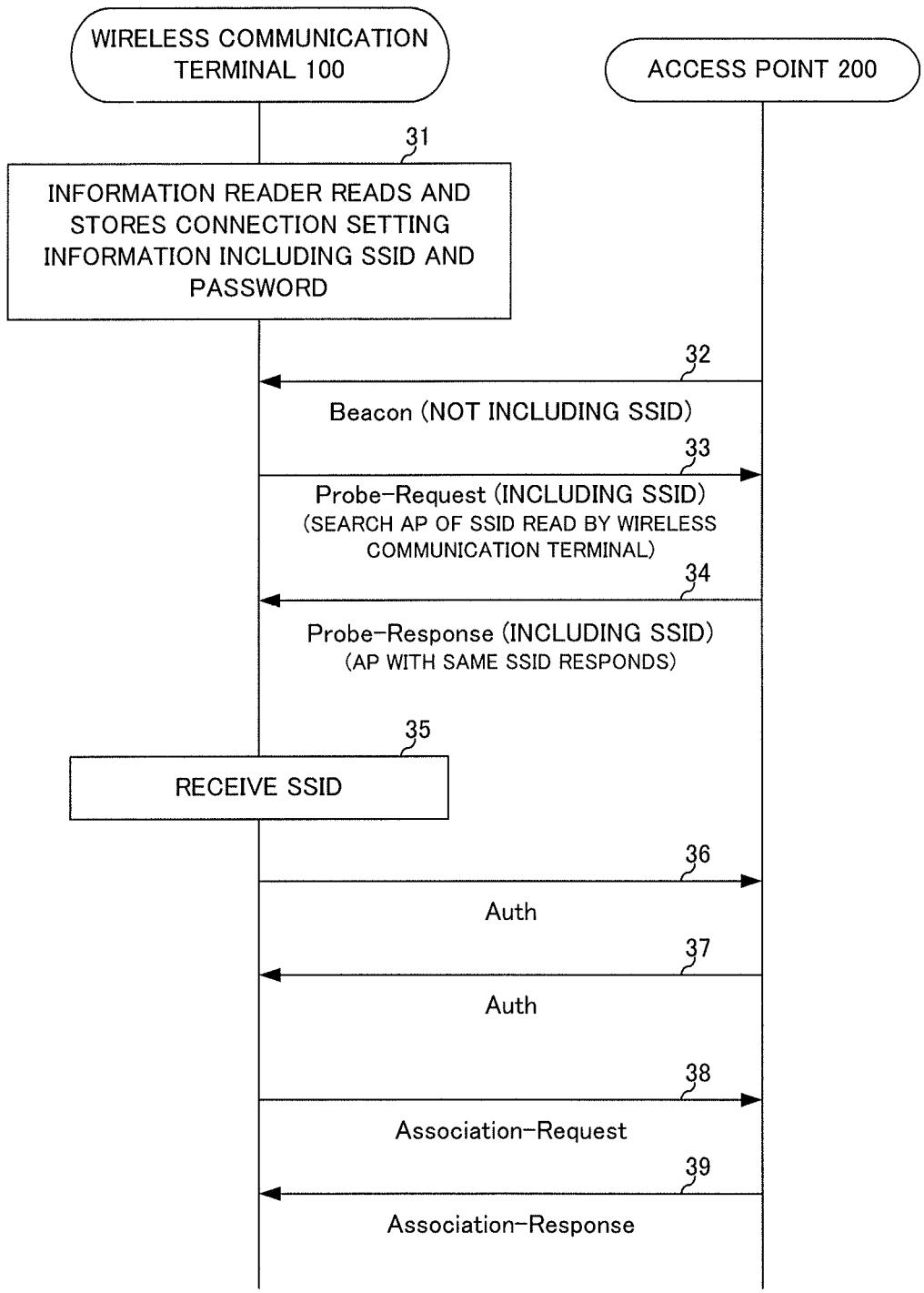
FIG. 11 is a sequence diagram for describing a reception process of an SSID according to the present invention when the access point does not broadcast the SSID.

The reception process of the SSID in the present invention when the access point does not broadcast the SSID will be described with reference to FIG. 11.

In step 31, information reader 110 of wireless communication terminal 100 reads the connection setting information including the SSID and the password of the access point from label 240 of access point 200, and controller 130 writes the read connection setting information in storage 120.

When access point 200 transmits a Beacon signal not including the SSID in step 32, wireless communication terminal 100 transmits a Probe-Request signal (including the SSID) to search the access point of the SSID read and stored by wireless communication terminal 100. In step 34, access point 200 of the SSID included in the Probe-Request signal transmits a Probe-Response signal (including the SSID) as a response signal to wireless communication terminal 100.

When wireless communication terminal 100 receives the SSID included in the Probe-Response signal in step 35, wireless communication terminal 100 transmits an Auth signal to access point 200 in step 36. Access point 200 transmits an Auth signal as a response signal to wireless communication terminal 100 in step 37.

In step 38, wireless communication terminal 100 transmits an Association-Request signal to access point 200. In step 39, access point 200 transmits an Association-Response signal as a response signal to wireless communication terminal 100.

Figure 12:
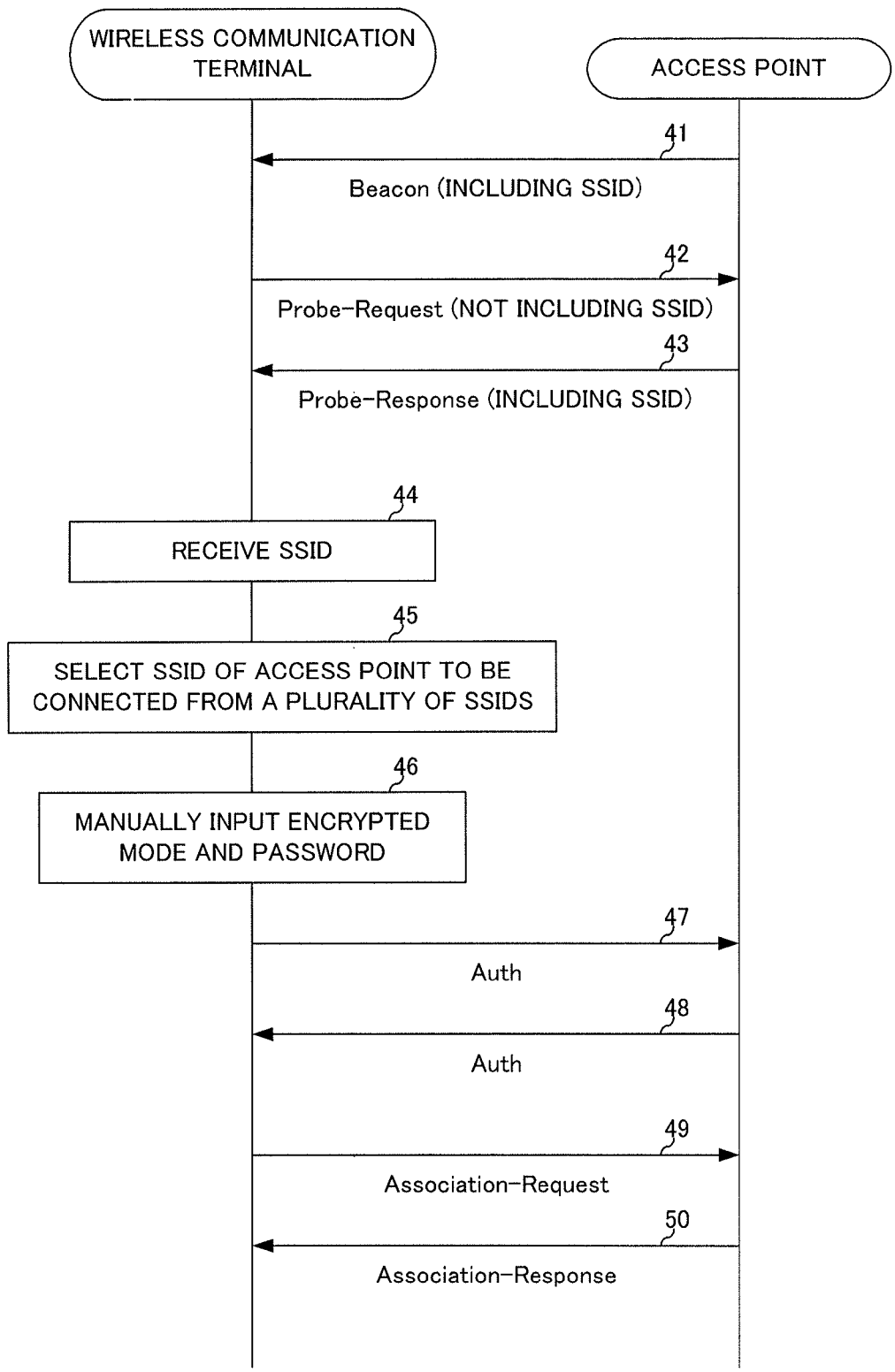
FIG. 12 is a sequence diagram for describing a general reception process of an SSID when the access point broadcasts the SSID.

A general reception process of the SSID when the access point broadcasts the SSID will be described with reference to FIG. 12.

When the access point transmits a Beacon signal including the SSID in step 41, the wireless communication terminal transmits a Probe-Request signal (not including the SSID) in step 42. In step 43, the access point transmits a Probe-Response signal (including the SSID) as a response signal to the wireless communication terminal.

When the wireless communication terminal receives the SSID included in the Probe-Response signal in step 44, the user selects an SSID of the access point to be connected from a plurality of SSIDs in step 45 if there are a plurality of received SSIDs. In step 46, the user manually inputs the encrypted mode and the password to the wireless communication terminal.

In step 47, the wireless communication terminal transmits an Auth signal to the access point. In step 48, the access point transmits an Auth signal as a response signal to the wireless communication terminal.

In step 49, the wireless communication terminal transmits an Association-Request signal to the access point. In step 50, the access point transmits an Association-Response signal as a response signal to the wireless communication terminal.

Figure 13:
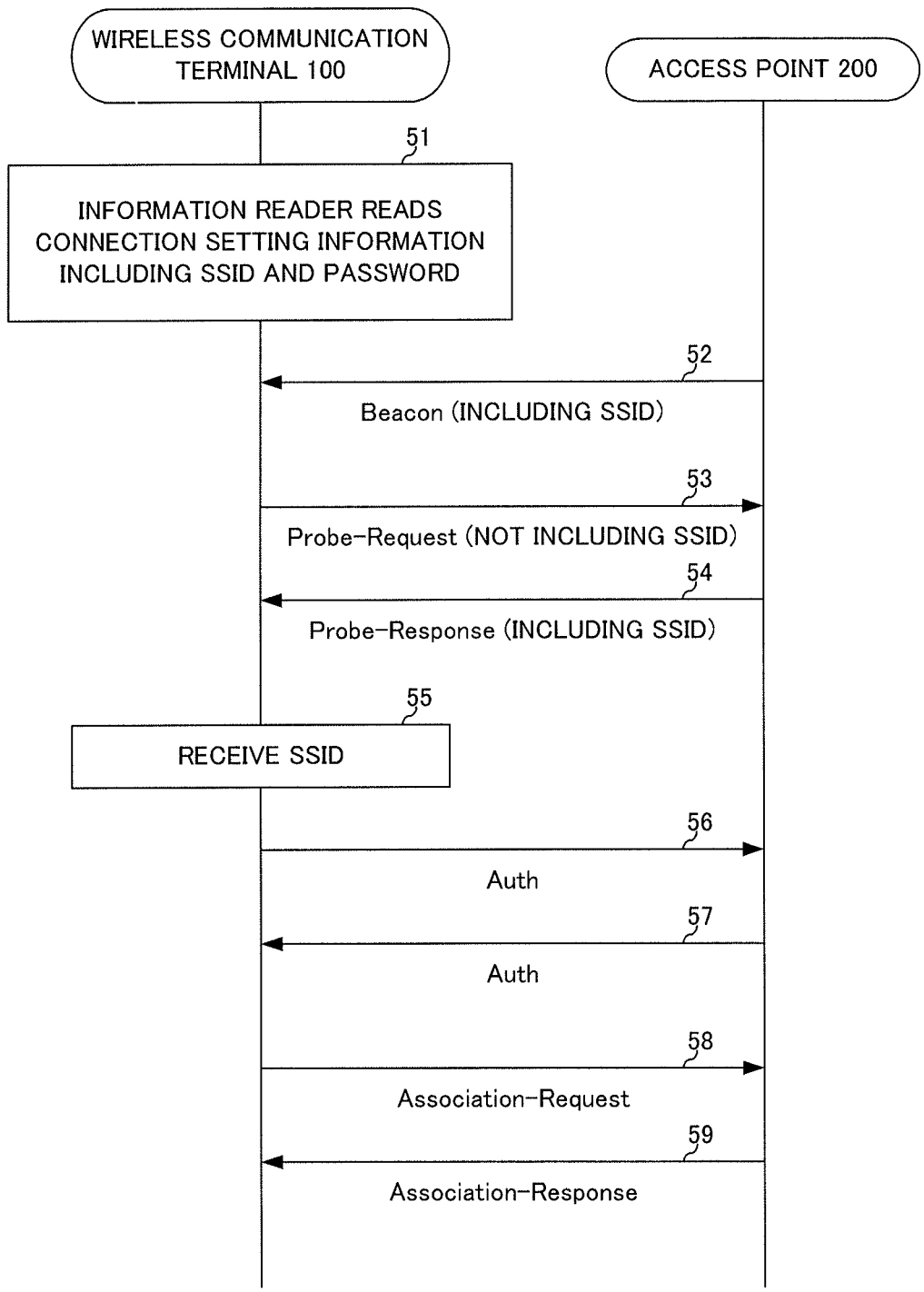
FIG. 13 is a sequence diagram for describing a reception process of an SSID according to the present invention when the access point broadcasts the SSID.

A reception process of the SSID in the present invention when the access point broadcasts the SSID will be described with reference to FIG. 13.

In step 51, information reader 110 of wireless communication terminal 100 reads the connection setting information including the SSID and the password of the access point from label 240 of access point 200.

When access point 200 transmits a Beacon signal including the SSID in step 52, wireless communication terminal 100 transmits a Probe-Request signal (not including the SSID) in step 53. In step 54, access point 200 transmits a Probe-Response signal (including the SSID) as a response signal to wireless communication terminal 100.

In step 55, when wireless communication terminal 100 receives the SSID included in the Probe-Response signal, wireless communication terminal 100 transmits an Auth signal to access point 200 in step 56 to set the wireless communication connection with access point 200 using the received SSID and the read connection setting information. In step 57, access point 200 transmits an Auth signal as a response signal to wireless communication terminal 100.

In step 58, wireless communication terminal 100 transmits an Association-Request signal to access point 200. In step 59, access point 200 transmits an Association-Response signal as a response signal to wireless communication terminal 100.

Figure 14:
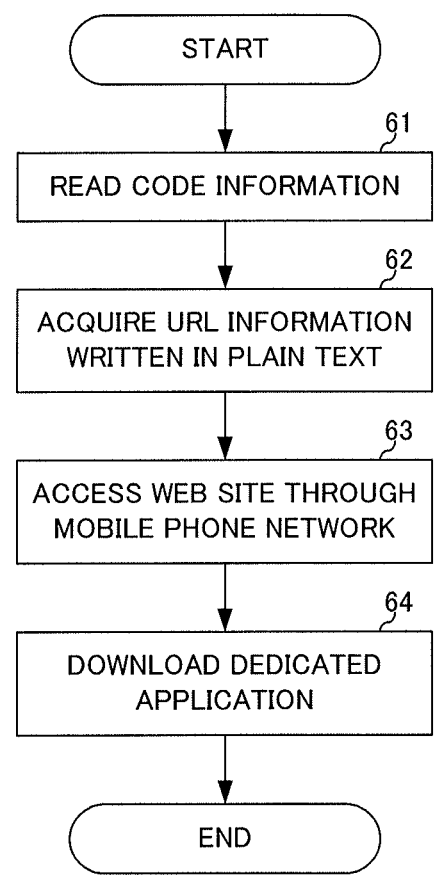
FIG. 14 is a flow chart for describing a process of using a general-purpose code reader to download a dedicated application.

A process of downloading a dedicated application using a general-purpose code reader will be described with reference to FIG. 14.

In step 61, the general-purpose code reader is used based on an operation by the user of wireless communication terminal 100 to read the code information displayed on the label attached to access point 200. In step 62, controller 130 acquires the URL information described in plain text in the read code information.

In step 63, controller 130 accesses the Web site indicated by the acquired URL through mobile phone network interface 150. In step 64, controller 130 downloads a dedicated application from the accessed Web site.

The version of the dedicated application may be able to be updated from the Web site indicated by the URL written in the code information when the version of the dedicated application is newer than the corresponding version.

If the SSID information, the encryption mode, or the encrypted key of access point 200 is changed, display unit 260 of access point 200 or access point 200 may serve as a WEB server to post new connection setting information on the WEB browser when a communication terminal, such as a PC (Personal Computer), accesses the WEB server through a wired/wireless LAN, and wireless communication terminal 100 may carry out the connection again.

In this way, the connection setting of the wireless LAN as well as the switch and selection of a plurality of profiles can be easily performed. This can reduce the connection operation by the user of the wireless LAN connection.

Logic circuits created according to the intended use may execute processes executed by the constituent elements arranged on wireless communication terminal 100. A computer program (hereinafter, called "program") describing details of the process as a procedure may be recorded in a recording medium readable by wireless communication terminal 100, and wireless communication terminal 100 may read and execute the program recorded in the recording medium. Examples of the recording medium readable by wireless communication terminal 100 include transferrable recording media, such as a floppy (registered trademark) disk, a magneto-optical disk, a DVD, and a CD, memories, such as storage 120, a ROM, and a RAM included in wireless communication terminal 100, and an HDD. Controller 130 arranged on wireless communication terminal 100 reads the program recorded in the recording medium, and the same process as described above is executed under the control of controller 130. Controller 130 operates as a computer that executes the program read from the recording medium that records the program.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A wireless communication terminal used in a wireless communication system including an access point, the wireless communication terminal comprising:
    an information reader that reads connection setting information for connection with the access point from an information providing medium which is attached to the access point, the connection setting information including a plurality of service set identifiers (SSIDs) of the access point;
    a storage that stores the connection setting information read by said information reader; and
    a controller that uses an SSID of the access point informed by the access point and the connection setting information read from said storage to set wireless communication connection with the access point,
    wherein the connection setting information includes a control command for the access point, and
    the controller is configured to read the connection setting information in accordance with the SSID of the access point informed by the access point from the storage and uses the connection setting information to set the wireless communication connection with the access point.

2. The wireless communication terminal according to claim 1, wherein
    the wireless communication system includes a plurality of wireless communication means using a plurality of same or different wireless systems.

3. The wireless communication terminal according to claim 1, wherein
    the connection setting information includes encrypted information for setting the wireless communication connection with the access point.

4. The wireless communication terminal according to claim 1, wherein
    the connection setting information is provided using a bar code, a two-dimensional code, or an RF tag.

5. The wireless communication terminal according to claim 4, wherein
    the connection setting information is provided using bar code, a two-dimensional code, or an RF tag after encryption of a character string of the connection setting information by an arbitrary encrypted mode.

6. The wireless communication terminal according to claim 1, wherein
    said controller uses predetermined connection setting information in the connection setting information stored in said storage to set the wireless communication connection with the access point.

7. The wireless communication terminal according to claim 6, wherein
    said controller uses a predetermined piece of connection setting information in the connection setting information stored in said storage to set the wireless communication connection with the access point.

8. The wireless communication terminal according to claim 1, wherein
    said controller uses connection setting information with highest encryption strength in the connection setting information stored in said storage to set the wireless communication connection with the access point.

9. The wireless communication terminal according to claim 1, wherein
    said controller sets the wireless communication connection with the access point according to reception strength of a wireless signal in the connection setting information stored in said storage.

10. The information providing medium that provides the connection setting information read by the wireless communication terminal according to claim 1.

11. The access point that provides the connection setting information read by the wireless communication terminal according to claim 1.

12. The access point according to claim 11, wherein
    the connection setting information is electronically displayed to provide the connection setting information.

13. A wireless communication method between an access point and a wireless communication terminal, the wireless communication method comprising:
    reading connection setting information for connection with the access point from an information providing medium which is attached to the access point, the connection setting information including a plurality of service set identifiers (SSIDs) of the access point;
    storing the read connection setting information;
    reading the stored connection setting information; and
    using an SSID of the access point informed by the access point and the read connection setting information to set the wireless communication connection with the access point,
    wherein the connection setting information includes a control command for the access point, and
    the reading includes the connection setting information in accordance with the SSID of the access point informed by the access point from the storage and using the connection setting information to set the wireless communication connection with the access point.

* * * * *